（12) United States Patent
Salokannel et al.

(10) Patent No.: US 7,920,495 B2
(45) Date of Patent: Apr. 5, 2011

(54) CHANNEL MANAGEMENT VIA LINK PARAMETER ADJUSTMENT

(75) Inventors: Juha Salokannel, Tampere (FI); Heikki Mattila, Oulu (FI); Seppo Kangasmaa, Helsinki (FI)

(73) Assignee: Nokia Corporation, Espoo (FI)

( * ) Notice: Subject to any disclaimer, the term of this patent is extended or adjusted under 35 U.S.C. 154(b) by 118 days.

(21) Appl. No.: 12/146,182

(22) Filed: Jun. 25, 2008

(65) Prior Publication Data

US 2009/0323720 A1   Dec. 31, 2009

(51) Int. Cl.
 *H04J 3/16* (2006.01)
(52) U.S. Cl. ......................................... 370/310; 370/468
(58) Field of Classification Search .................. 370/241, 370/252, 465, 468
See application file for complete search history.

(56) References Cited

U.S. PATENT DOCUMENTS

| 6,072,784 | A * | 6/2000 | Agrawal et al. ............... 370/311 |
| 7,050,445 | B1 | 5/2006 | Zellner et al. |
| 2002/0041592 | A1* | 4/2002 | Van Der Zee et al. ........ 370/389 |
| 2002/0114292 | A1* | 8/2002 | Kawabata et al. ............ 370/329 |
| 2002/0118649 | A1* | 8/2002 | Farley et al. .................. 370/252 |
| 2002/0188723 | A1* | 12/2002 | Choi et al. ..................... 709/225 |
| 2005/0163059 | A1* | 7/2005 | Dacosta et al. ............... 370/252 |
| 2006/0029089 | A1* | 2/2006 | Zellner et al. ................. 370/412 |
| 2006/0203723 | A1* | 9/2006 | Shirakabe et al. ............ 370/229 |
| 2007/0076672 | A1 | 4/2007 | Gautier et al. |
| 2007/0099567 | A1 | 5/2007 | Chen et al. |
| 2009/0054029 | A1* | 2/2009 | Hogberg et al. ........... 455/404.2 |

FOREIGN PATENT DOCUMENTS

EP   1583295 A2   10/2005

OTHER PUBLICATIONS

PCT Search Report mailed Oct. 21, 2009 for international application serial No. PCT/FI2009/050572.

* cited by examiner

*Primary Examiner* — Kevin C Harper
(74) *Attorney, Agent, or Firm* — Locke Lord Bissell & Liddell

(57) ABSTRACT

A system for allocating communication resources in an apparatus. For example, an apparatus that is enabled to support a plurality of wireless transports may identify a resource-intensive task to be executed using a wireless transport. Prior to the execution of the resource-intensive task, the apparatus may determine if any wireless links already exist, and whether to alter operational parameters for one or more of the existing wireless links in order to make resources available for expediting completion of the resource-intensive task.

21 Claims, 11 Drawing Sheets

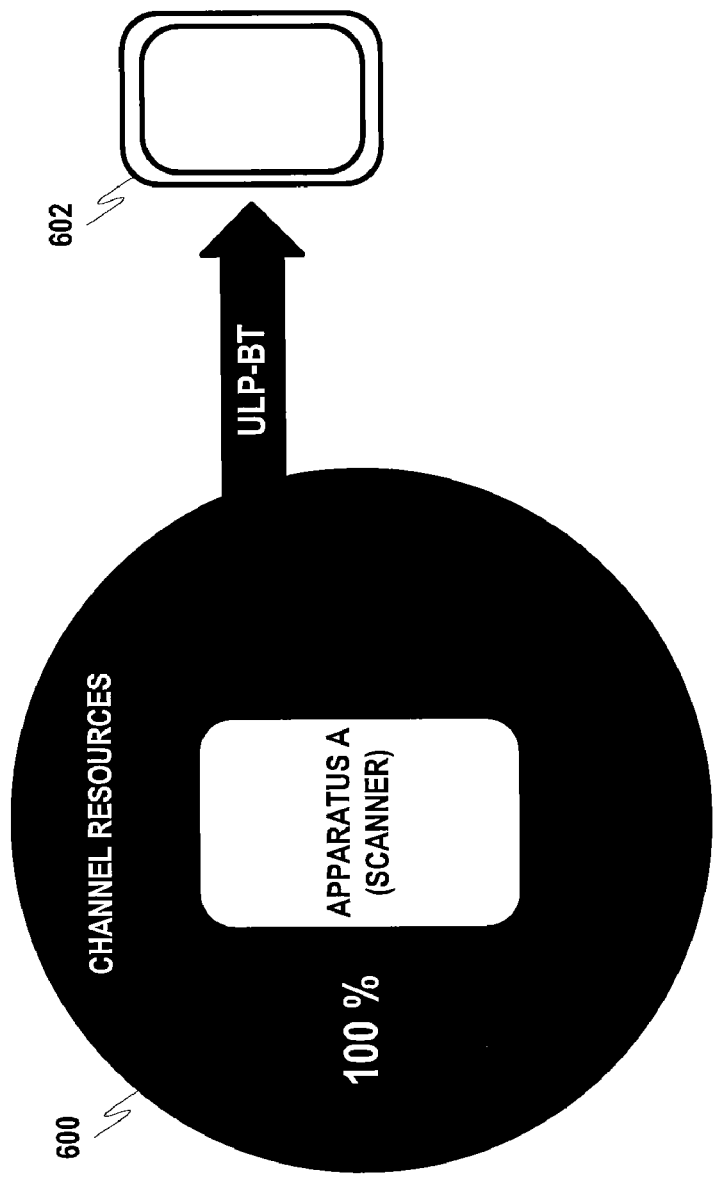

Channel Management via Link Parameter Adjustment

BACKGROUND

1. Field of Invention

Various embodiments of the present invention relate to coordinating wireless apparatus operation, and more specifically, to a system that may adjust link parameters for one or more existing wireless links to release resources for use by potentially resource-intensive tasks.

2. Background

Apparatuses enabled for wireless communication are continuing to become more integrated in ordinary daily activity. This growth in utilization may be due, at least in part, to rapid technological development occurring in the area of multifunction wireless communication devices (WCD). Due to improvements in speed, quality of service, etc., these apparatuses may now replace common standalone devices, like computers, laptops, facsimile machines, personal digital assistants, etc., with a single apparatus capable of performing all of these functions. These abilities have been embraced by users who often find that tasks can now be completed during time that was previously wasted (e.g., commuting to and from work, school, home, etc.)

However, while these apparatuses may be empowered with a variety of beneficial features, the small size and power constraints of these apparatuses may also create challenges for users. Operator interfaces installed in these apparatuses are often small, and therefore, may not be conducive to inputting large amounts of data. As a result, users may rely on peripheral input apparatuses such as keyboards, mice, headsets, etc. in order to perform their work. Further, the small size of many apparatuses today also implies that there is a lack of physical connections to connect wired apparatuses. Therefore, multifunction wireless devices should not only support a wireless connection to one peripheral device, but should also be able to support simultaneous connections with multiple peripheral apparatuses, as well as concurrent links to various resources that may provide voice and data service over long-range and/or short-range wireless transports.

The ability to maintain a plurality of wirelessly connections concurrently will necessitate the division of wireless communication resources to support these connections. Ideally, all wireless activity would utilize available resources equally or at least in a manner so as not to impact other connections. However, different wireless transports executing different tasks (e.g., connection establishment, voice communication, data transfer, etc.) may utilize a variable amount of resources depending on the phase of the aforementioned tasks. As a result, resource-intensive instances in one or more of the active connections may overwhelm apparatus resources allocated to these connections, which may negatively impact the performance of the particular connection, all active connections, or possibly the overall performance of the wireless apparatus.

SUMMARY

Example implementations of the present invention, in accordance with various embodiments, may be directed to at least a method, apparatus, computer program and system for allocating communication resources in an apparatus. For example, an apparatus that is enabled to support a plurality of wireless transports may identify a resource-intensive task to be executed using a wireless transport. Prior to the execution of the resource-intensive task, the apparatus may determine if any wireless links already exist, and whether to alter operational parameters for one or more of the existing wireless links in order to reallocate resources for expediting completion of the resource-intensive task.

In accordance with at least one embodiment of the present invention, the resource-intensive task may originate from an application executing in the apparatus. The apparatus may then determine whether any wireless links already exist before executing the resource-intensive task using a wireless transport, and if any existing wireless link will possibly interfere with, or will share resources with, the wireless transport. Existing wireless links may interfere with the wireless transport if, for example, any of the existing wireless links and the wireless transport will operate in the same channel bandwidth. In another example, existing wireless links may share resources with the wireless transport if any of the existing wireless links and the wireless transport will require access to the same physical apparatus resources.

If any existing wireless link will possibly interfere with, or share resources with, the wireless transport, then operational parameters corresponding to these existing wireless links may be adjusted in order to avoid potential conflicts and/or to allocate resources to the wireless transport. Adjusting operational parameters corresponding to one or more existing wireless links may include, for example, reducing a data rate parameter, reducing a required quality of service parameter, suspending operation of one or more of the existing wireless links, etc.

DESCRIPTION OF DRAWINGS

The present invention may be understood from the following detailed description of various implementation examples taken in conjunction with the appended drawings, wherein:

FIG. 6A discloses an example of a scenario wherein an apparatus may interact with another apparatus in accordance with at least one embodiment of the present invention.

DESCRIPTION OF EXAMPLE EMBODIMENTS

While the present invention has been described below embodied in terms of one or more implementation examples, various changes can be made therein without departing from the spirit and scope of the invention, as described in the appended claims.

I. Wireless Communication Device

As previously set forth, the present invention, in accordance with at least one embodiment, may be implemented utilizing a variety of apparatuses. Therefore, establishing an understanding of wirelessly-enabled apparatuses that may be used in implementing these various example embodiments may aid in comprehending the following disclosure. For example, in the case of a cellular handset, palmtop or laptop computer, wireless communicator or other handheld wireless apparatus, the integrated data handling capabilities of the apparatus may play an important role in facilitating transactions between the transmitting and receiving apparatuses.

Figure 1A:
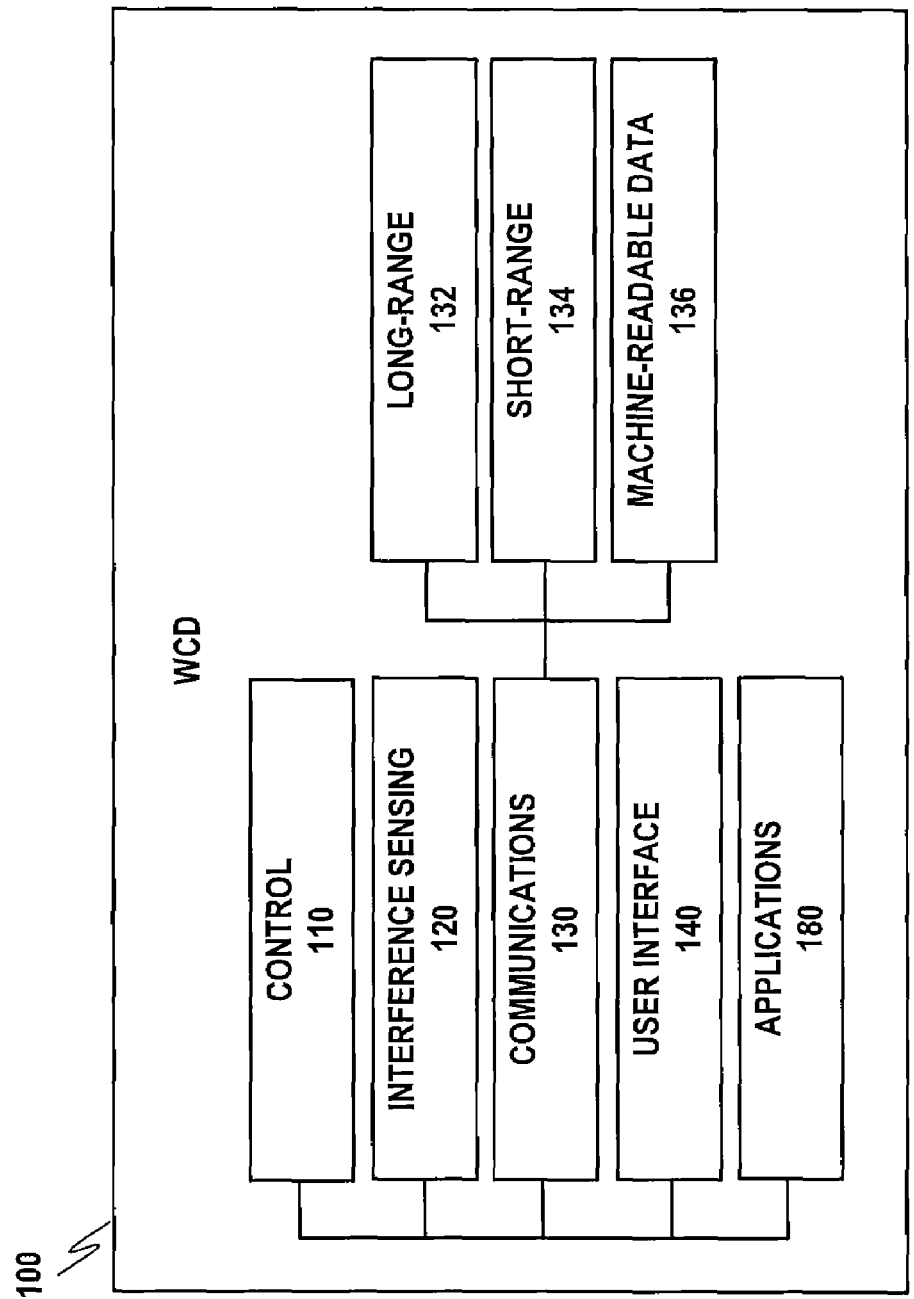
FIG. 1A discloses an example of a wireless communication device, in terms of a modular layout, that may be usable with at least one embodiment of the present invention.

FIG. 1A discloses an example of a modular layout for a wireless communication device usable with various example embodiments of the present invention. WCD 100 may be represented as an organization functional modules corresponding to the various operational aspects/elements of the apparatus. These functional modules may be implemented by various combinations of software and/or hardware components as previously discussed below.

Control module 110 may regulate the operation of the apparatus. Inputs into control module 110 may be received from various other modules included within WCD 100. For example, interference sensing module 120 may use various techniques known in the art to sense sources of environmental interference within transmission range of WCD 100. Control module 110 may interpret these inputs, and in response, may issue control commands to other modules.

Communications module 130 may generally incorporate all of the wired and/or wireless communication features of WCD 100. As shown in FIG. 1A, communications module 130 may include, for example, long-range communication module 132, short-range communication module 134 and machine-readable data module 136. Communications module 130 may utilizes at least these sub-modules to receive a multitude of different types of communication from both local and long distance sources, and to transmit data to apparatuses within the transmission range of WCD 100. Communications module 130 may be triggered by control module 110, or by control resources local to the module responding to sensed messages, environmental influences and/or other apparatuses in proximity of WCD 100.

User interface module 140 includes visual, audible and tactile elements which allow a user to receive data from, and enter data into, the apparatus. The data entered by a user may be interpreted by control module 110 to affect the behavior of WCD 100. User-inputted data may also be transmitted by communications module 130 to other apparatuses within transmission range (e.g., for wireless communication). Conversely, other apparatuses may also send information to WCD 100 via communications module 130, and control module 110 may cause this information to be transferred to user interface module 140 for presentment to the user.

Applications module 180 may incorporate all other hardware and/or software resources on WCD 100. Applications in this module may include sensors, interfaces, utilities, interpreters, data applications, or any other functionality executable on WCD 100. Applications within application module 180 may be invoked by control module 110 to, for example, read information provided by various modules and in turn supply information to requesting modules.

Figure 1B:
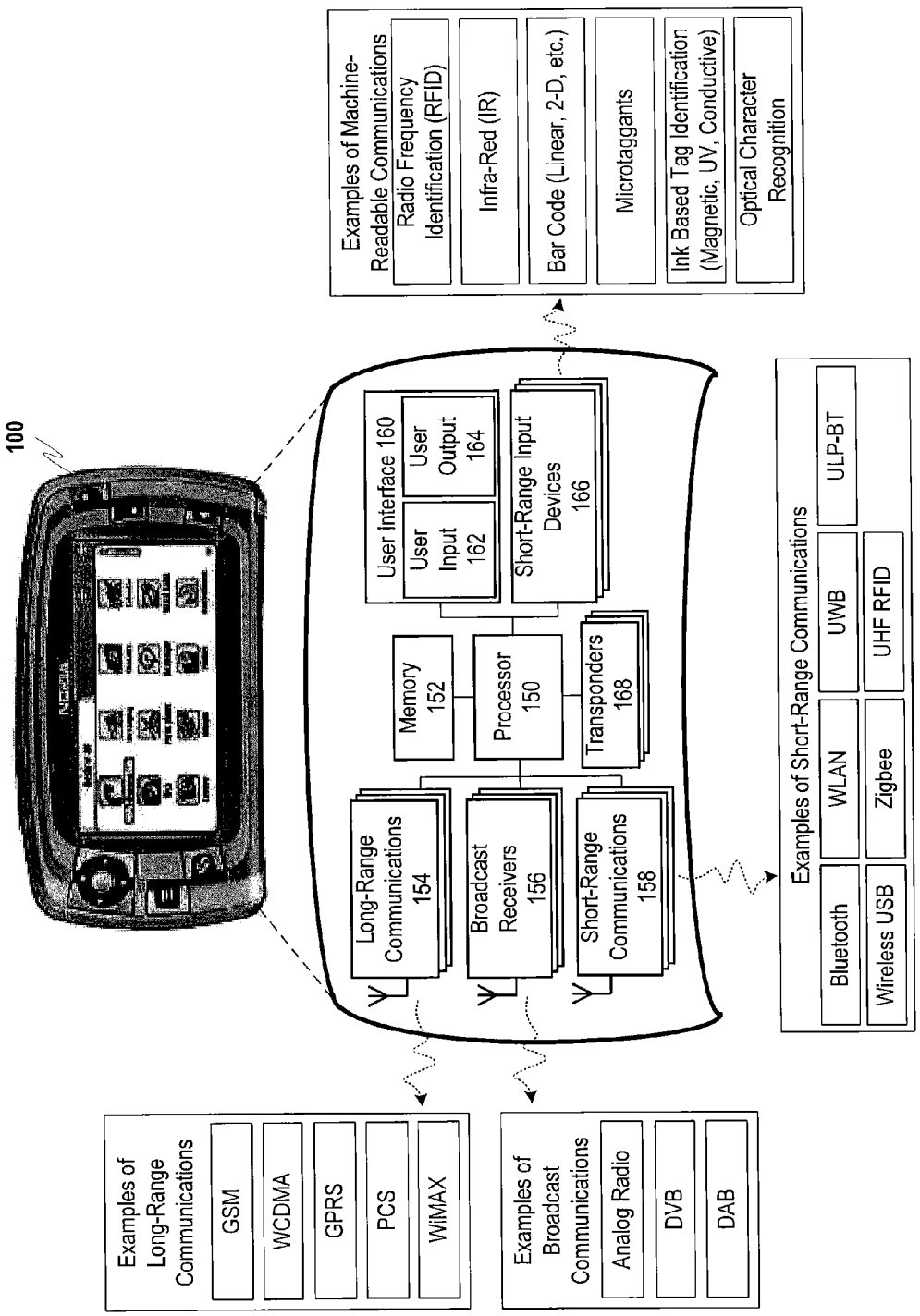
FIG. 1B discloses an example of a structural description for the wireless communication device previously described in FIG. 1A.

FIG. 1B discloses a structural layout example for WCD 100, in accordance with at least one embodiment of the present invention, usable for implementing the functionality of the modular system previously described with respect to FIG. 1A. Processor 150 may control overall apparatus operation, for example, by interfacing with other elements in WCD 100, like communication sections 154, 158 and 166. Processor 150 can be implemented with one or more microprocessors that are each capable of executing software instructions stored in memory 152.

Memory 152 may include fixed and/or removable memory media (e.g., magnetic, optical, etc.) that may comprise, for example, random access memory (RAM), read only memory (ROM), rewritable solid state memory like flash, etc. Memory 152 may store information in the form of data and software components (also referred to herein as modules). The data stored by memory 152 may be associated with particular control, application or database modules such as command databases, contacts databases or business databases for scheduling, email, etc.

The software components stored by memory 152 may include computer-readable instructions that can be executed by processor 150. Various types of software components may be stored in memory 152. For instance, memory 152 may store software components that control communication sections 154, 158 and 166. Memory 152 may also store software components related to operating system components, user interfaces, applications, utilities, security, entertainment and any communication utilities modules required to support WCD 100.

Long-range communications 154 may perform activities related to the exchange of information over large geographic areas (such as cellular network communication). These long-range network technologies have traditionally been classified by generations, starting in the late 1970s to early 1980s with first generation (1G) analog cellular telephones that provided baseline voice communication, to modern digital cellular telephones. Global System for Mobile Communications (GSM) is an example of a widely employed 2G digital cellular network communicating in the 900 MHZ/1.8 GHZ bands in Europe and at 850 MHz and 1.9 GHZ in the United States. In addition to voice functionality (e.g., via GSM), long-range communications 154 may operate to establish wireless data communication sessions, such as General Message Radio Service (GPRS) sessions and/or Universal Mobile Telecommunications System (UMTS) sessions. Long-range communications 154 may also operate to transmit and receive text messages, such as via the short messaging service (SMS), and/or multimedia content via multimedia messaging service (MMS) messages.

As a subset of long-range communications 154, or alternatively operating as an independent module separately coupled to processor 150, broadcast receivers 156 allows WCD 100 to receive unsolicited wireless communication via mediums such as Digital Video Broadcast for Handheld Apparatuses (DVB-H). Transmissions may be encoded so that only certain apparatuses may access transmission content, and may contain text, audio or video information. In at least one example, WCD 100 may receive broadcasts and/or information within the broadcast signal to determine if the apparatus is permitted to view the received content.

Short-range communications 158 may support the exchange of information across short-range wireless networks. As described above and depicted in FIG. 1B, examples of such short-range communications 158 are not limited to Bluetooth™, Ultra Low Power Bluetooth™ (ULP-BT), Wireless Local Area Network (WLAN), Ultra-Wide Band (UWB) and Wireless Universal Serial Bus (WUSB) connections. Short-range communications 158 may perform functions related to the establishment of short-range connections, as well as processing related to the transmission and reception of wireless information via, for example, the above connections.

Short-range input device 166, also depicted in FIG. 1B, may provide functionality related to the short-range scanning of machine-readable data (e.g., Near Field Communication (NFC)). For example, processor 150 may control short-range input device 166 to generate Radio Frequency (RF) scanning signals for activating a Radio Frequency Identification (RFID) transponder, and may in turn control the reception of signals from an active transponder. Other short-range scanning methods for reading machine-readable data that may be supported by short-range input apparatus 166 are not limited to Infra-Red (IR) communication, linear and 2-D (e.g., Quick Response (QR)) bar code readers (including processes related to interpreting universal product codes (UPC) labels), and optical character recognition devices for reading magnetic, Ultraviolet (UV), conductive or other types of coded data that may be provided in a tag using suitable ink. In order for short-range input apparatus 166 to scan the aforementioned types of machine-readable data, the input device may include optical detectors, magnetic detectors, Charge Coupled Devices (CCDs) or other sensors known in the art for interpreting machine-readable information.

As further shown in FIG. 1B, user interface 160 may also be coupled to processor 150. User interface 160 may facilitate the exchange of information with a user of an apparatus. User interface 160, as shown, may include user input 162 and user output 164. User input 162 may include one or more components that allow a user to input data into WCD 100. Examples of such components include keypads, touch screens, microphones, etc. User output 164 may allow a user to obtain information from WCD 100. Thus, user output portion 164 may include various components, such as a display, Light Emitting Diodes (LED), tactile emitters, audio speakers, etc. Displays usable in user output 164 may include, for example, Liquid Crystal Displays (LCDs) and other types of video displays.

WCD 100 may also include one or more transponders 168. A transponder may be an essentially passive apparatus that may be programmed by processor 150 with information to be delivered in response to a scan from an outside source. For example, an RFID scanner mounted in an entryway may continuously emit radio frequency waves. When an apparatus containing transponder 168 passes through the entryway, the transponder may be energized and may respond with information identifying the apparatus, person, security information (e.g., security codes), etc. In addition, a reader may be mounted (e.g., as discussed above with regard to examples of short-range input device 166) in WCD 100 so that it can read information from other transponders in the vicinity. Further, in an alternative configuration the reader may be equipped with logic that provides means for the reader to also operate as a transponder.

Hardware corresponding to communications sections 154, 156, 158 and 166 provide for the transmission and reception of signals. Accordingly, these sections may include components (e.g., electronics) that perform functions such as modulation, demodulation, amplification, and filtering. These sections may be locally controlled, or may be controlled by processor 150 in accordance with software communication components stored in memory 152.

The elements shown in FIG. 1B may be constituted and coupled according to various techniques in order to produce the functionality described in FIG. 1A. One such technique involves coupling separate hardware components corresponding to processor 150, communications sections 154, 156 and 158, memory 152, short-range input device 166, user interface 160, transponder 168, etc. through one or more wired or wireless bus interfaces. Alternatively, any and/or all of the individual components may be replaced by an integrated circuit in the form of a programmable logic apparatus, gate array, ASIC, multi-chip module, etc. programmed to replicate the functions of the stand-alone components. Each of these components may be coupled to a power source, such as a removable and/or rechargeable battery (not shown).

During apparatus operation, user interface 160 may, for example interact with one or more communication software components (e.g., stored in memory 152) that may provide for the establishment of communication service sessions using long-range communications 154 and/or short-range communications 158. The communication utility software components may include various routines that allow for the transmission and reception of information and services from remote apparatuses according to mediums such as the Wireless Application Medium (WAP), Hypertext Markup Language (HTML) variants like Compact HTML (CHTML), etc.

II. Wireless Communication Mediums

In accordance with at least one example embodiment, the present invention may be implemented with a short-range wireless communication medium. Bluetooth™ is an example of a commonly employed short-range wireless technology. A Bluetooth™-enabled WCD may transmit and receive data, for example, at a rate of 720 Kbps within a range of 10 meters, and may transmit up to 100 meters with additional power boosting. Current Bluetooth™-enabled apparatuses may operate at a nominal rate of 1 Mbps. A user does not have to actively instigate a Bluetooth™ network. Instead, a plurality of apparatuses within communication range of each other may automatically form a network group called a "piconet". Any apparatus may promote itself to be the master of the piconet, allowing it to manage data exchanges between up to seven "active" slaves and 255 "parked" slaves. Active slaves may exchange data based on the clock timing of the master. Parked slaves may monitor a beacon signal in order to stay synchronized with the master apparatus, and wait for one of the seven active slots to become available. The networked Bluetooth™ apparatuses may continually switch between active and power saving modes in order to conserve resources when not communicating with other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), Ultra Low Power Bluetooth™ (ULP-BT) and UHF RFID.

The present invention, in accordance with various example embodiments, may be implemented with any communication configuration enabled to operate, for example, in a manner similar to the above identified communication mediums. While Ultra Low Power Bluetooth™ (ULP-BT) will be used for the sake of explanation in the following disclosure, as previously set forth, the following example embodiments of the present invention are not specifically limited to this wireless communication medium. ULP-BT is an open standard industry initiative that was initially called Wibree™ at its introduction, but has since been adopted by the Bluetooth™ Users Group for use in extending local connectivity to small apparatuses. ULP-BT may enable close range communication with Bluetooth™-like performance of 1 Mbps in the 0-10 meter range. ULP-BT may be optimal for installations requiring extremely low power consumption, small size and low cost. ULP-BT may be implemented either as stand-alone chip or as Bluetooth™ ULP-BT dual-mode chip.

Figure 2:
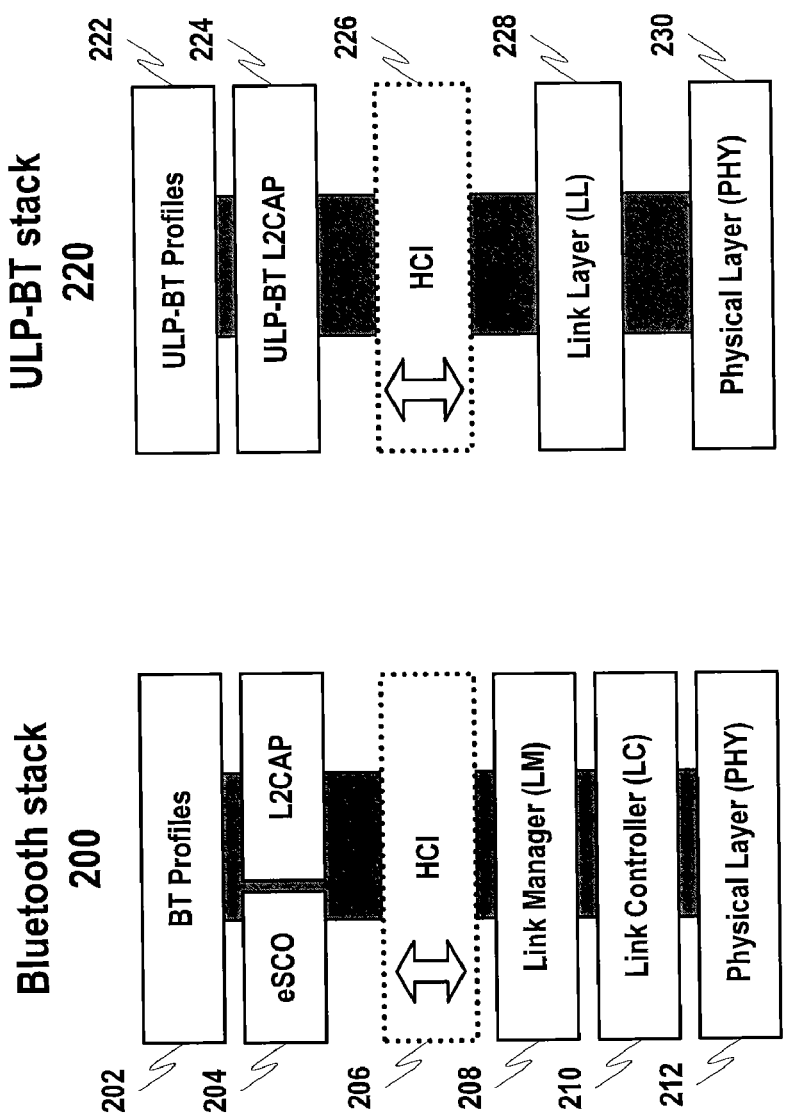
FIG. 2 discloses an example of a Bluetooth™ protocol stack and an Ultra Low Power Bluetooth™ protocol stack usable with at least one embodiment of the present invention.

Now referring to FIG. 2, an example of a Bluetooth™ protocol stack and an example of a ULP-BT protocol stack are shown. Bluetooth™ stack 200 may include elements that convey information from a system level to a physical layer where it may then be transmitted wirelessly to another apparatus. At the top level, BT Profiles 202 include at least a description of a known peripheral apparatuses that may be wirelessly coupled to WCD 100, or an application that may utilize Bluetooth™ in order to engage in wireless communication with a peripheral apparatus. The use of the phrase "peripheral apparatuses" is not intended to limit the scope of the present invention, and is used only to represent any apparatus external to WCD 100 that is also capable of wirelessly communicating with WCD 100. Bluetooth™ profiles corresponding to other apparatuses may be established, for example, through a pairing process wherein identification and connection information for a peripheral apparatus may be received by WCD 100 by polling the other apparatus. This information may then be saved in order to expedite the connection to the apparatus at a later time.

After the application and/or target peripheral apparatus (or apparatuses) have been established, information to be sent must be prepared for transmission. Extended Synchronous Connection Oriented (eSCO) logical transport/Logical Link Control and Adaptation Protocol (L2CAP) layer 204 may include at least a transport adapted to support voice transmission error handing (e.g., packet retransmission) while improving audio latency, as well as a logical link controller and adaptation protocol. The L2CAP may support higher level protocol multiplexing message segmentation and reassembly, and the conveying of quality of service information. The information prepared by eSCO/L2CAP level 204 may then be passed to an application-optional host controller interface (HCI) 206. This layer may provide a command interface to the lower link manager protocol (LMP) layers, link manager (LM) 208 and link controller (LC) 210. LM 208 may establish the link setup, authentication, link configuration and other protocols related to establishing a wireless link between two or more apparatuses. Further, LC 210 may manage active links between two or more apparatuses by handling low-level baseband protocols. Wireless communication may then be established and conducted using hardware (modem, antenna, etc.) residing in physical layer (PHY) 212. Of course, the above identified layers of Bluetooth™ stack 200 may also be utilized in an order reversed from that disclosed above in order to receive a wireless transmission into WCD 100 from a peripheral apparatus.

The layers in the standalone ULP-BT stack 220 are similar to the elements previously described. However, due to the relative simplicity of ULP-BT when compared to Bluetooth™, there may actually be fewer layers utilized to achieve wireless communication. ULP-BT Profiles 222, similar to the profiles used in Bluetooth™, may specify applications that can use ULP-BT for communication, as well as peripheral apparatuses with which a ULP-BT modem may wirelessly communicate. An adaptation layer 224 may be used to prepare the information for transmission via wireless communication. L2CAP 224 may be similar to Bluetooth™, but configured for simplified and/or low-power operation. HCI 226 may provide an interface between the upper layers communicating with applications and schedulers in WCD 100, and the lower layers of the ULP-BT stack 220 which establish and maintain the links to peripheral apparatuses. Lower layers of the ULP-BT stack 220 may further include at least link layer (LL) 228. LL 228 may both establish and maintain wireless communications with other wireless enabled apparatuses through the use of Physical Layer (PHY) 230. However, LL 228 as shown in the ULP-BT stack may differ significantly from LM 208 and LC 210 in Bluetooth™.

III. Dual-Mode Modem

Figure 3A:
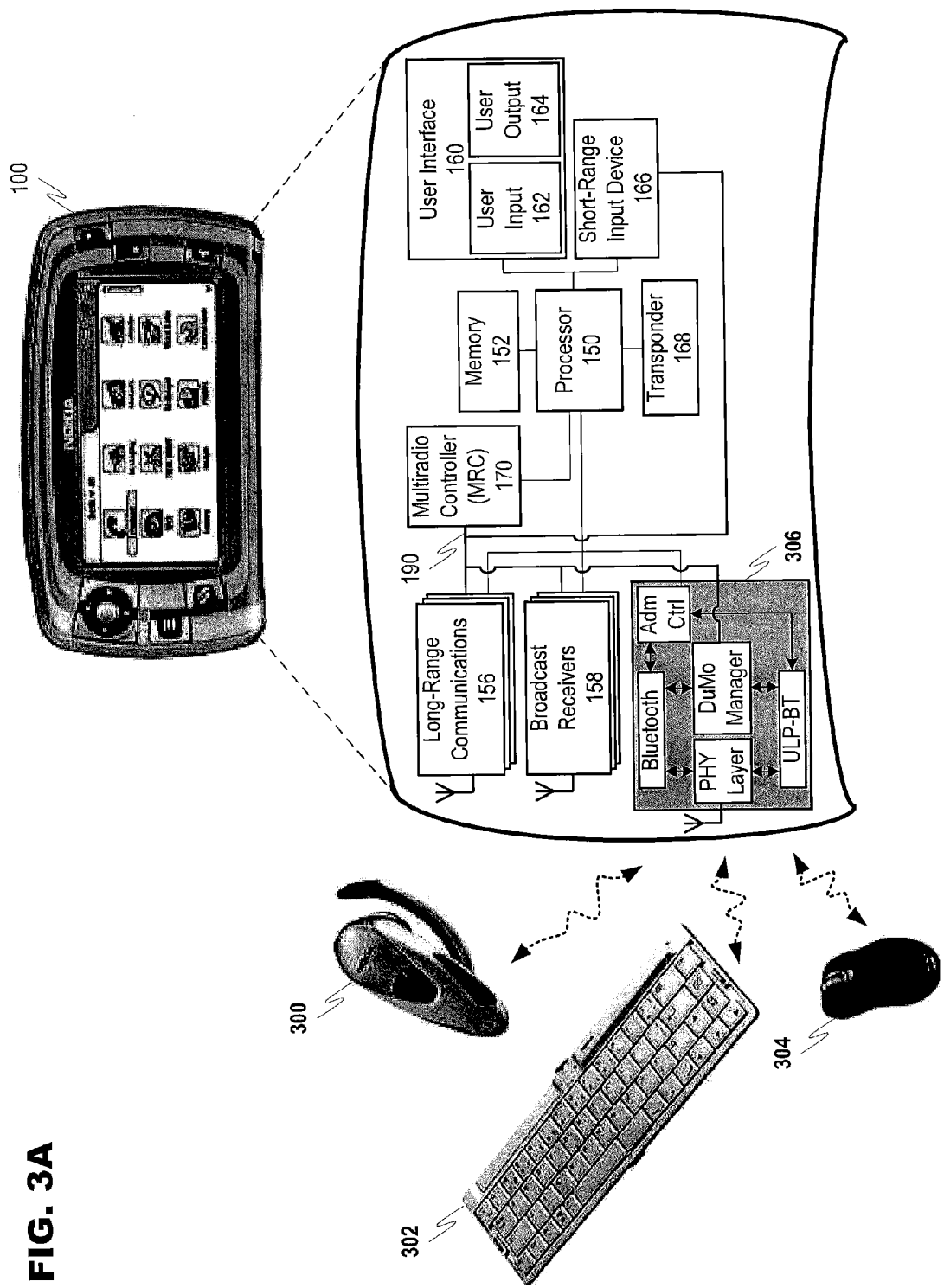
FIG. 3A discloses an example of multiple wireless peripheral apparatuses attempting to communicate concurrently with a dual-mode radio modem in accordance with at least one embodiment of the present invention.

FIG. 3A discloses an example of a communication configuration usable in implementing various embodiments of the present invention. Again, in this example the three peripheral apparatuses (300, 302 and 304) are attempting concurrent communication with WCD 100 through dual-mode radio modem 306. Radio modem 306 may include local control resources for managing both "radios" (e.g., Bluetooth™ and ULP-BT software based radio control stacks) attempting to use PHY layer resources of dual-mode radio modem 306. In this example, radio modem 306 may include at least two radio stacks or radio protocols (labeled "Bluetooth" and "ULP-BT") that may share PHY layer resources (e.g., hardware resources, antenna, etc.) of radio modem 306. The local control resources may include an admission controller ("Adm Ctrl") and a dual-mode controller ("DuMo Manager"). These local control resources may be embodied as a software program and/or in hardware form (e.g., logic apparatus, gate array, MCM, ASIC, etc.) in a dual-mode radio modem interface, and the radio modem interface may be coupled to, or alternatively, embedded in dual-mode radio modem 306. The interaction of these control resources with the protocols utilizing dual-mode radio modem 306 is explained below.

Figure 3B:
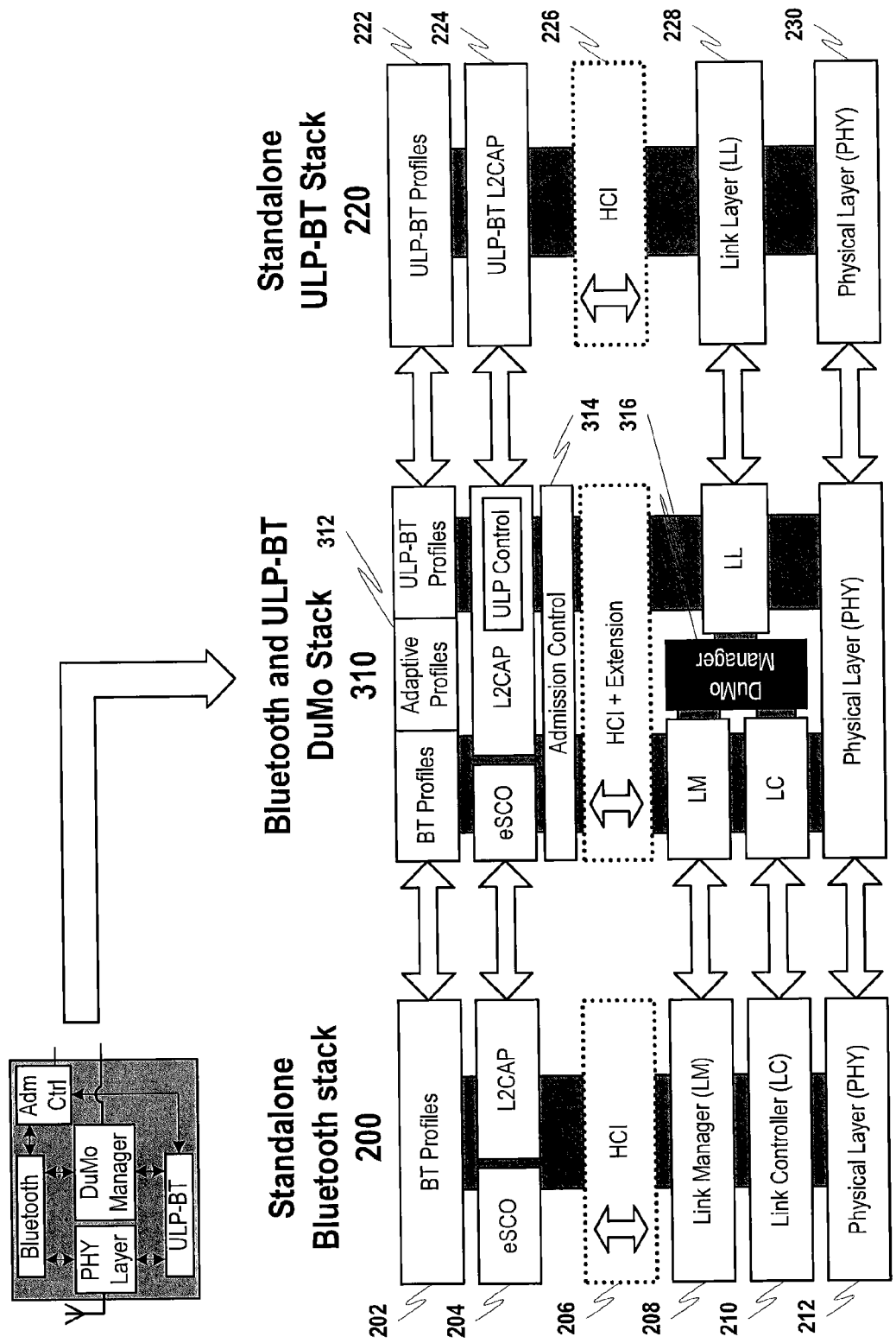
FIG. 3B discloses further detail pertaining to the example of FIG. 3A regarding operational enhancements for managing the operation of a dual-mode modem in accordance with at least one embodiment of the present invention.

In FIG. 3B, an example of the combination of the two individual radio protocol stacks discussed in FIG. 2 into a single dual-mode communication entity is now disclosed. Adaptive profiles 312 may span, or may be hybrids of, both BT and BT-ULP profiles. Local control may be implemented by at least an admission control 314 and a DuMo manager 316. The two previously described standalone protocol stacks are shown to establish the individual elements that may be incorporated into integrated dual-mode entity 310. For a more specific discussion of the functioning of admission control 312 and a DuMo manager 316 in terms of managing the operations of dual-mode modem 306, please refer to application Ser. No. 11/538,310, filed Oct. 3, 2006, which is hereby incorporated by reference. Briefly, Admission control 312 may operate as a gateway for dual-mode radio modem 306 by filtering out Bluetooth™ and ULP-BT communication requests from other entities in WCD 100 that may result in conflicts. Scheduling information may also be provided by Multiradio controller (MRC) 170, wherein certain periods of operation are allocated to dual-mode radio modem 306 in view of the other active radio modems operating in WCD 100. This scheduling information may be passed down to both the HCI+Extension level of the dual-mode stack and also to DuMo manager 316 for further processing. However, if scheduling information from MRC 170 is critical (e.g., delay-sensitive), it may be sent through MCS 190 via a direct connection to DuMo Manager 316. The information received by DuMo manager 316 may be used to create a schedule for dual-mode radio modem 300 allowing both Bluetooth™ and ULP-BT to operate substantially concurrently.

IV. Protocol Stacks and Message Routing

Figure 4:
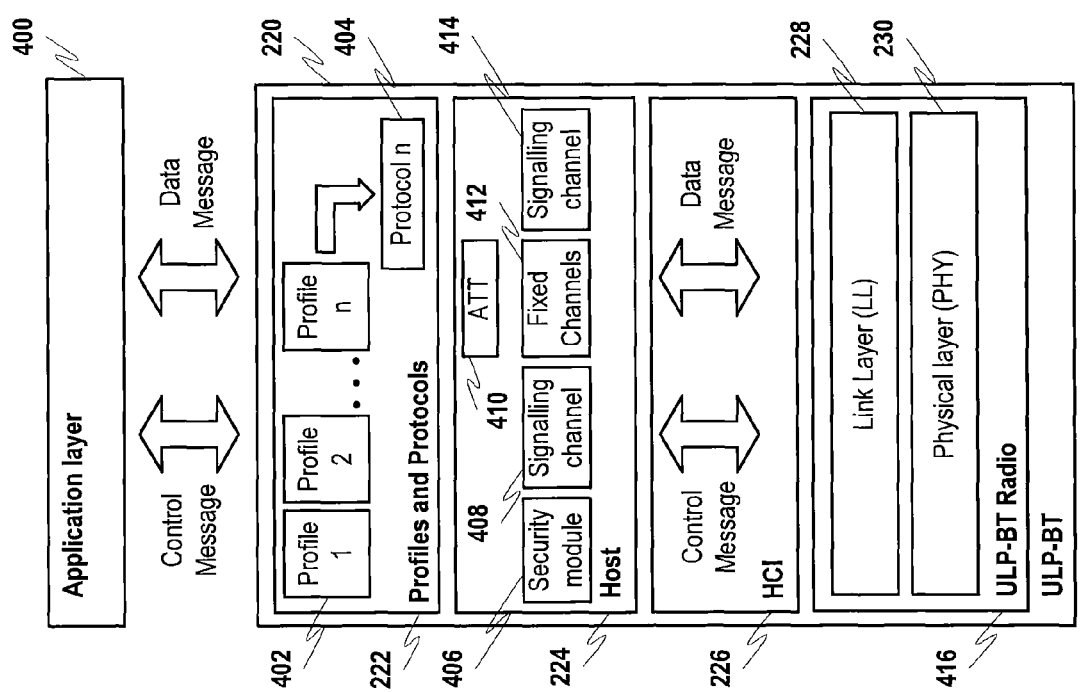
FIG. 4 discloses a more detailed example of an Ultra Low Power Bluetooth™ protocol stack in accordance with at least one embodiment of the present invention.

FIG. 4 discloses a more detailed example of the upper layers of the ULP-BT communication protocol. The ULP-BT system may comprise ULP-BT Profiles and Protocols 222, ULP-BT Host 224, ULP-BT HCI 226 and ULP-BT Radio 416. Application layer 400 may include, for example, various programs executable by a computing apparatus. Examples of applications may include communication, entertainment or productivity programs running on WCD 100. Applications may utilize Profiles and Protocols 222 in order to send information into the ULP-BT protocol stack 220 in a transaction that may be supervised by Host 224. Profiles and Protocols 222 may include one or more profiles 402 and/or protocols 404.

Host 224 may accept information from a profile 402 in Profiles and Protocols 222 via ATT 410. Host 224 may then process the information in preparation for transmission using one or more of security module 406, signaling channel 408, fixed channels 412 and signaling channel 414. The information may then be routed to ULP-BT radio 416 via HCI 226, wherein LL 228 may both establish new wireless connections and manage existing connections with peripheral apparatuses through the resources (modem, antenna, etc.) included in PHY layer 230.

V. Communication Between an Advertiser and at Least One Receiving Apparatus with Connection.

Figure 5:
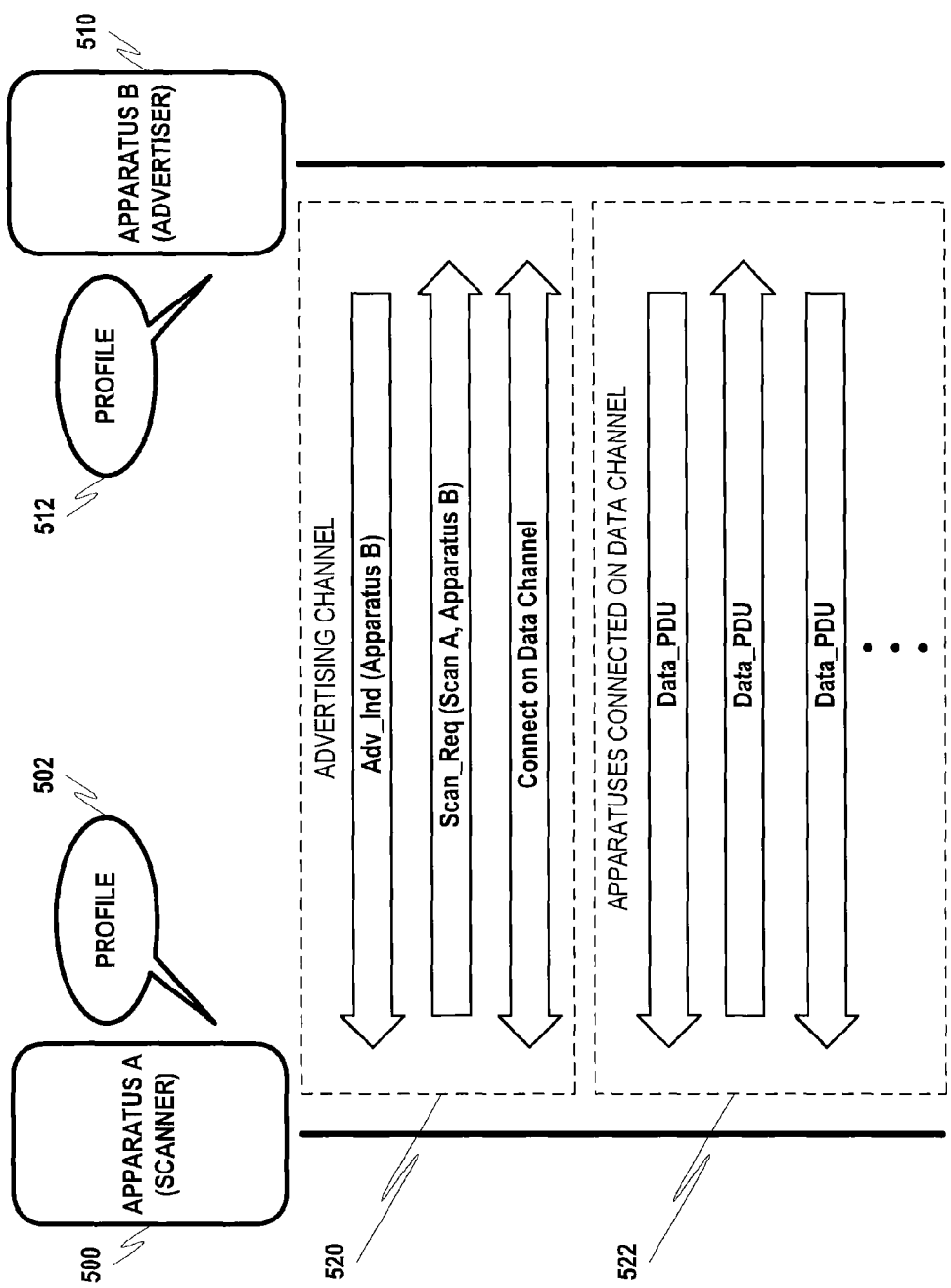
FIG. 5 discloses an example of communications between an advertiser and a receiving apparatus in accordance with at least one embodiment of the present invention.

Referring now to FIG. 5, an example of communication between apparatuses, including the establishment of a formal network connection, is disclosed. Apparatus A 500 (hereafter referred to as scanner 500) may initiate wireless communication with Apparatus B (hereafter referred to as advertiser 510) after receiving a broadcast signal from advertiser 510. The initiation of wireless communication by scanner 500 and subsequent interaction between these apparatuses may be automatic or manual (e.g., including at least some intervention from user). Apparatuses 500 and 510 may also include communication profiles 502 and 512, respectively. Further, these apparatuses may be known to each other before the interaction shown in FIG. 5A (e.g., they may be two apparatuses owned by the same user), or alternatively, they may have previously been unknown to each other, such as, for example, in a scenario where a user in possession of WCD 100 moves into transmission range of advertiser 510 at a public location, such as a shopping mall.

As set forth above, advertiser 510 may broadcast a signal to all apparatuses within transmission range. The advertising signal may be repeated periodically, may be triggered by another apparatus (e.g., a motion sensor) alerting advertiser 510 to the presence of a potential scanning apparatus 500, etc. Information included in the broadcast signal, ADV_IND, may include introductory information at least identifying advertiser 510, for example in the form of a dedicated apparatus name, and possibly also including profile information. This identification may be public (e.g., the actual fixed apparatus address) or may be private (e.g., a dynamically generated pseudonym that receiving apparatuses can decode, using an algorithm, and compare to stored information to determine whether advertiser 510 is the same device as previously encountered without disclosing the public address of the advertiser). For security reasons, there are few scenarios where an apparatus would actually need to disclose its public address. The ADV_IND message may be broadcast, according to at least one embodiment of the present invention, on an advertising channel. All potential scanners 500 may be aware that any broadcast messages should be expected on the designated advertising channel (also, in some instance, called the initialization channel). In a more specific scenario, ULP-BT may include three predetermined advertising channels. Therefore, scanner 500 and advertiser 510, when using ULP-BT, may be able to utilize one or more of the three advertising channels in a strategy to enhance broadcast coverage in view of advertising channel availability.

Scanner 500, upon receiving the ADV_IND message from advertiser 510, may either ignore the message and continue listening for another ADV_IND message with different content, or may initiate communications with advertiser 510. At least one scenario where scanner 500 may continue to listen to the advertising signal may be in order to collect all available introductory information from advertiser 510 (e.g., advertiser identification and available profile information). Scanner 500 may respond, for example, if advertiser 510 is identified and/or recognized as having information of interest to an apparatus user. This recognition may occur automatically, or alternatively, the user may be alerted to the presence of advertiser 510, whereby the user may act manually by prompting scanner 500 (e.g., WCD 100) to respond to the advertising message. Alternatively, scanner 500 may respond simply by acknowledging the reception of information from advertiser 510. Scanner 500 may then transmit a message requesting a formal network connection with advertiser 510. If advertiser 510 is in a condition to honor the request (e.g., advertiser 510 is, for example, not already connected to another apparatus/ exceeded maximum connections, has adequate power, etc.) a formal network connection may be established between the two apparatuses 500 and 510.

A formal network connection, such as shown in FIG. 5 ("APPARATUSES CONNECTED ON DATA CHANNEL"), will not be established on the advertising channel. Instead, a different channel specifically for the subsequent exchange of data may be selected by one or both of the apparatuses. This new connection will allow the apparatuses to exchange information without occupying the advertising channel. The exchange of data (e.g., Data_PDU) may continue until scanner 500 receives all data requested from advertiser 510, or alternatively, until either apparatus breaks the link (e.g., out of range, power limitation, interference, etc.)

V. Examples of Device Interaction.

FIG. 6A discloses a scenario wherein, for example, scanner 500 utilizes channel resources 600 in order to maintain a wireless link to apparatus 602. While the particular wireless transport being utilized in the disclosed example is Ultra Low Power Bluetooth™ (ULP-BT), the example embodiments of the present invention disclosed herein are not specifically limited to the configuration, as shown, or the particular wireless transports being implemented for the sake of explanation therein. As shown in FIG. 6A, 100% of channel resources 600 may be devoted to the ULP-BT wireless link scanner 500 and apparatus 602 (making them "BT-ULP channel resources 600") between as no other activities currently require the use of channel resources 600.

Figure 6B:
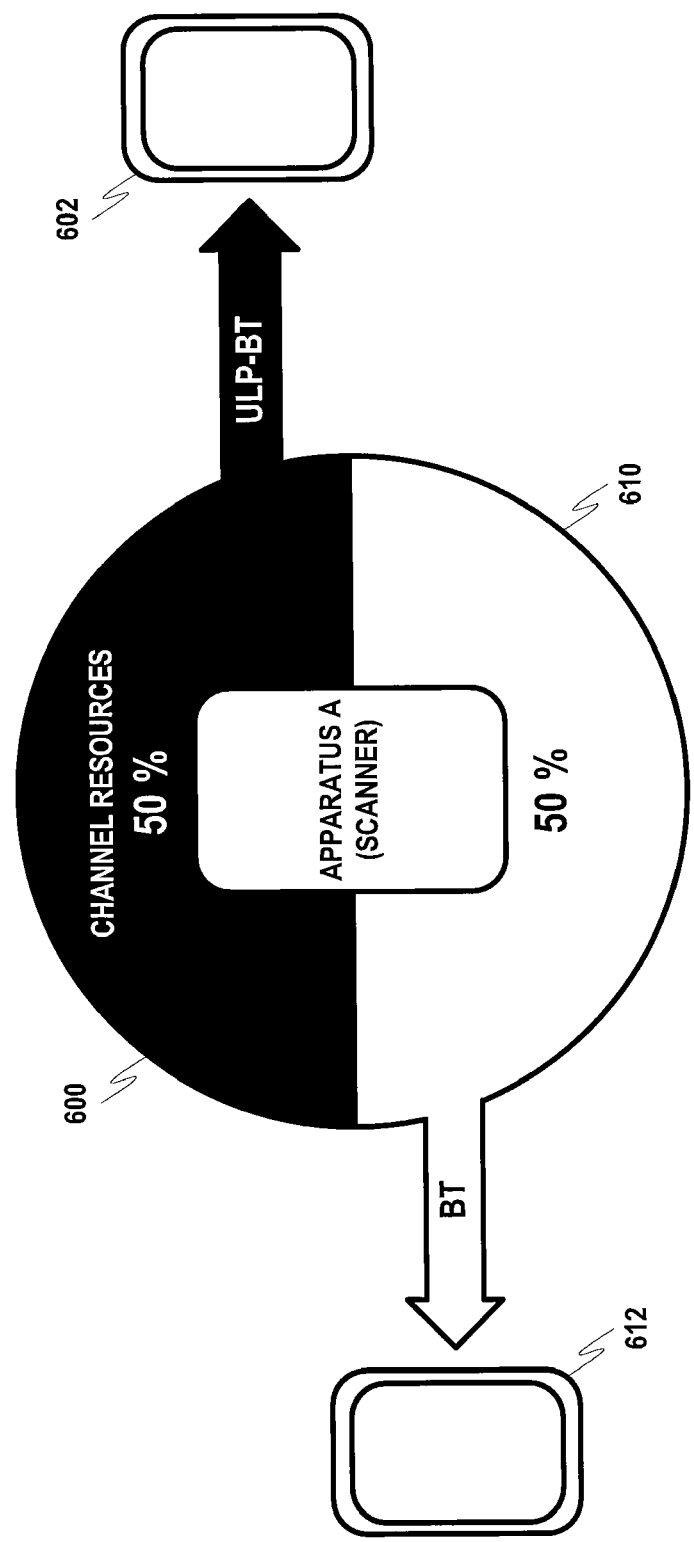
FIG. 6B discloses an example of a scenario wherein an apparatus may interact with multiple apparatuses in accordance with at least one embodiment of the present invention.

However, FIG. 6B discloses another scenario wherein a resource-intensive task may be executed between scanner 500 and another apparatus 612. The wireless transport being utilized in this instance, only for the sake of example, is Bluetooth™ (BT). In accordance with existing practices, available channel resources in scanner 500 may be divided equally between the active wireless transports. Therefore, the available channel resources may be split evenly, allocating 50% to ULP-BT channel resources 600 to ULP BT and 50% to BT channel resources 612. While a 50/50 split has been disclosed, the depicted division of resources is used only for the sake of explanation in the following disclosure, and other allocations of available resources may also be applicable in various example implementations. In an ideal scenario this even distribution of resources would allow both the ULP-BT and BT connections to operate uninterrupted while maintaining the quality of service (QoS) required by the tasks being executed. However, certain resource-intensive tasks occurring, for example, over the BT link may have the capacity to consume resources over that which has been allocated as shown in BT channel resources 610. These tasks may include, but are not limited to, device discovery, connection establishment, large data transfers (e.g., multimedia or image files), etc.

Regardless of a need to execute resource-intensive tasks using BT as the wireless transport, any transactions will nonetheless be limited to using only 50% of the available channel resources as shown at 610. This resource limitation imposed on the BT link may result in resource-intensive tasks taking longer to complete, which may negatively impact the speed, QoS, etc. of at least the BT link and any application in scanner 500 requiring execution of these tasks. It is also foreseeable that other wireless transports in scanner 500 that share common resources with the BT link (e.g., ULP-BT) may also be impacted, as well as other apparatus functionality. Adding to the impact of this resource mismanagement is a possible excess of resources reserved for the ULP-BT link. While 50% of channel resources 600 have been allocated to ULP-BT, a wireless transport designed for low power and/or low data capacity communication may not be able to utilize 50% of the channel resources, even when operating at full utilization. Further, applications to which wireless transports like ULP-BT may be applied may not be sensitive to slow speeds or particularly heavy with respect to the amount of data being conveyed. For example, these applications may be directed to receiving small amounts of data like sensor information (e.g., temperature) collected periodically or simple alert indicators transmitted at the occurrence of a triggering event (e.g., when an incoming call is received). As a result, some of channel resources 610 allocated to the ULP-BT link may go unused, and therefore be wasted.

Figure 7:
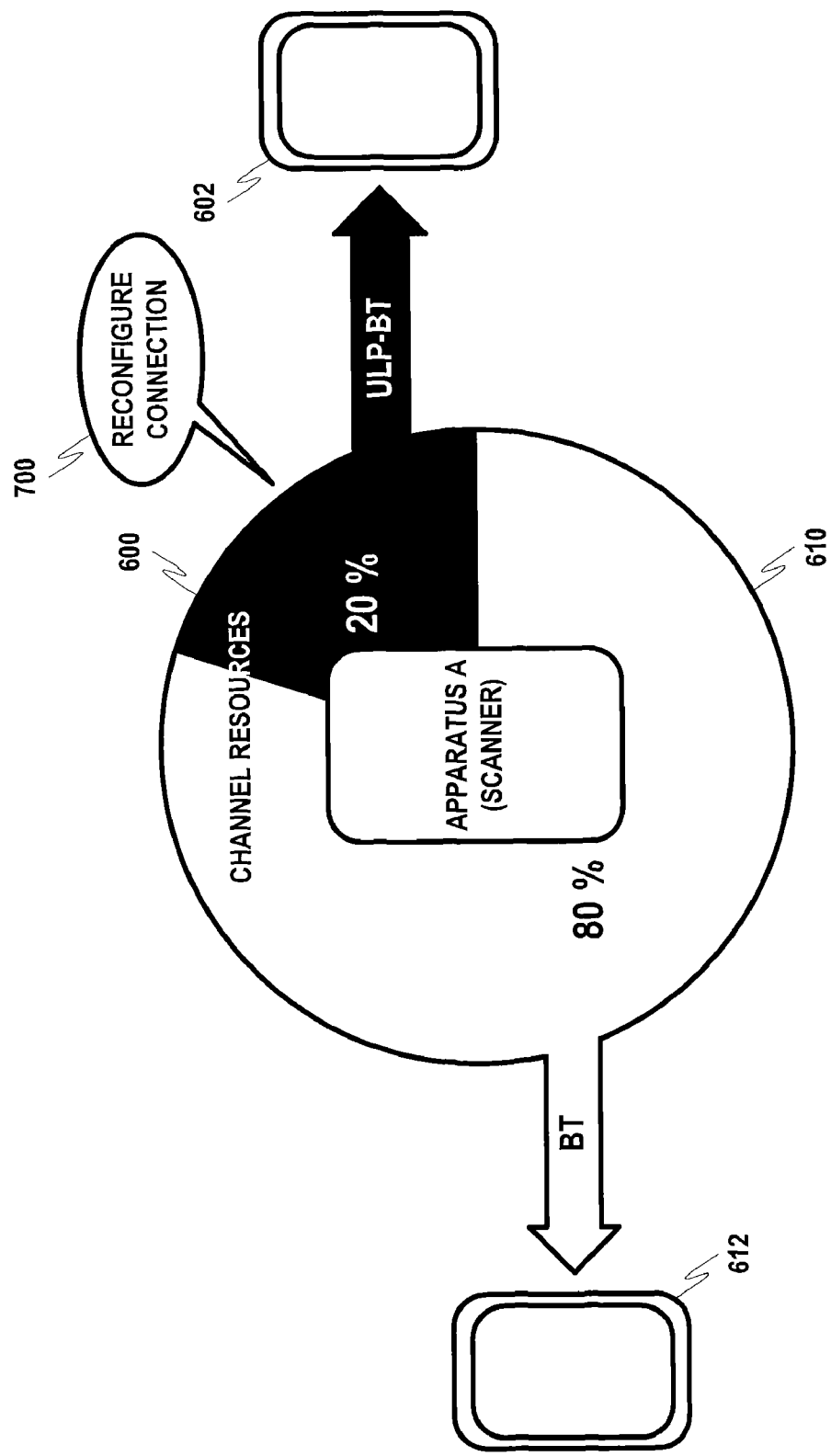
FIG. 7 discloses an example of an adjustment of existing wireless link parameters in accordance with at least one embodiment of the present invention.

FIG. 7 discloses an example of connection reconfiguration being utilized in order to reallocate resources in accordance with at least one embodiment of the present invention. It may be possible in some instances to alter the link parameters of one or more existing wireless links in order to free up resources for the performance of a resource-intensive task in another wireless link. Further, the reallocation of these resources may not substantially impact the performance of the existing wireless link if resources allocated to the wireless link are being fully utilized. For example, it may be assumed that low-power and/or low capacity wireless transports can be reconfigured to operate in a more resource-constrained manner without substantially impacting the performance. Using this assumption, a determination may be made that in instances where a resource-intensive task is to be performed, any low-power and/or low-capacity wireless transports may be deemed lower in priority than more robust wireless transports. As a result, link parameters for one or more low-power and/or low capacity wireless mediums may be reconfigured to utilize less channel resources. These resources may then be reallocated to areas of need, for example, in order to complete resource-intensive operations in an efficient, and possibly expedited, manner.

In accordance with the example of FIG. 7, reconfiguration of link parameters for the ULP-BT link may reduce channel resources 600 to, for example, 20% of the available resources in scanner 500. However, various low-power and/or low-capacity wireless transports that may be usable in various embodiments of the present invention may require only 20% of the available channel resources to still operate effectively. In the depicted scenario, a determination may be made based on various assumptions or rules that govern wireless transport parameter adjustment. For example, traffic coming from ULP-BT radio 220 may be less critical (e.g., no audio is expected to be sent over BT-ULP) for applications and/or users in terms of temporary delays that may be caused by other resource intensive tasks. Instead, ULP-BT radio 220 may be used in gathering noncontiguous sensor data by polling sensors once a second. However, sensor data loss may occasionally occur, and this expected loss may be taken into account by data handling programs.

In an attempt to proactively expedite overall apparatus operation, ULP-BT radio connection parameters may temporarily tuned "down" for the purpose of freeing up resources for resource-intensive operations over other radio connections. Proactive operation in this context may include adjusting link parameters corresponding to one or more low priority radios prior to resource-intensive tasks causing channel overloads, thereby avoiding problems for other active wireless links. An example of a tunable link parameter is the connection supervision timeout parameter in ULP-BT, which may be increased temporarily in order to maintain a ULP-BT connection even if the connection is temporarily idle for periods longer than normal operation.

In at least one implementation, a functional module (e.g., one or more software modules that may be executable in an apparatus such as WCD 100) may be utilized to identify pending and/or scheduled tasks that may potentially be "resource-intensive." This functional module may, for example, be integrated as a component of example ULP-BT radio stack 220 (e.g., as a sub-module of ULP-BT host 402) or DuMo stack 310 as shown in FIG. 3B, and may further monitor activity in application layer 400. When events or states indicative of resource-intensive tasks are detected, the functional module may then evaluate the operational condition of communication resources in the apparatus (e.g., in ULP-BT radio 408) and may determine, alone or in combination with other operational control elements in the apparatus, a control strategy that will help provide resource-intensive tasks with the resources required for execution.

In one example of operation, DuMo manager 316 may proactively tune one or more link parameters of a low-power and/or low-capacity wireless link (e.g., ULP-BT). During this process, ULP-BT host 402 may or may not be informed of the temporary change in connection parameters. Alternatively, radio resource-related indications from, for example, the BT radio module or BT host may be passed up to ULP-BT host, which then may execute the required actions to slow down ULP-BT radio module activity. For example, in a scenario where ULP-BT is the wireless transport that will be adjusted in order to provide resources for a resource-intensive task, at least the following messages and/or parameters may be utilized in implementing various embodiments of the present invention: a CONNECTION_UPDATE_REQ message may be sent to the ULP-BT slave device(s). This message may change one or more of the connection parameters (connInterval, connSlaveLatency, connTimeout) for a ULP-BT link in order to slow down activities (responses, reactions, etc.) occurring on the ULP-BT connection.

In terms of parameters that may be adjusted, a connection interval (connInterval, the main polling interval) may be increased even if it would not deliver information as required by an application utilizing ULP-BT. Connection slave latency (connSlaveLatency) may also be increased to slow down the activity on the ULP-BT link, but it may not be effective since slaves are still allowed to answer every poll message. Connection timeout (connTimeout) may also be lengthened so that slave devices do not drop the connection as quickly as they normally would. However, practical limits exist beyond which linked apparatuses may drift so much as to become unsynchronized. Implementations may be made flexible through the use of ULP-BT or similar wireless transports. Slave devices may decrease the probability of losing synchronization with a master by extending their listening windows. While this change may make the link slower, it may also be more delay-tolerant. After the resource-intensive task is complete (or has proceeded to the point allowing a return to normal operation), the apparatus may return to the connection parameters established before resources were made available for the resource-intensive task.

Figure 8:
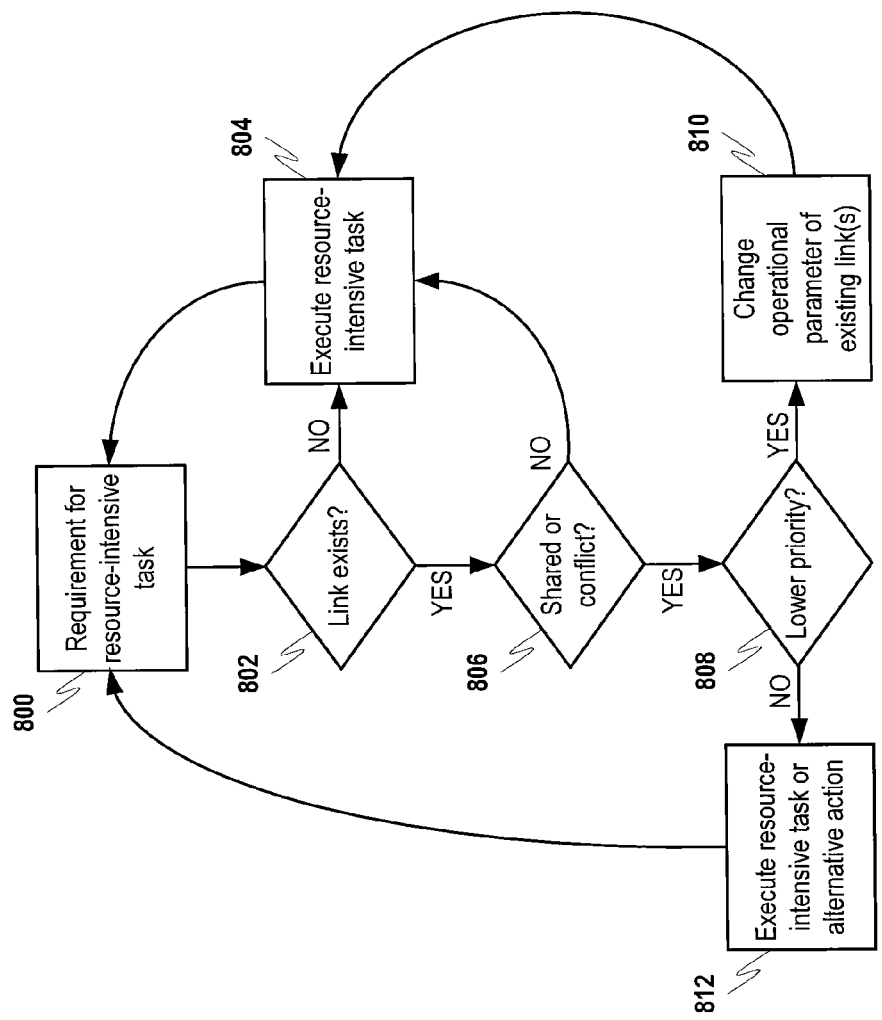
FIG. 8 discloses a flowchart of a process example wherein existing wireless link parameters may be adjusted in accordance with at least one embodiment of the present invention.

Now referring to FIG. 8, a flowchart describing an example of a process that may be implemented in accordance with at least one embodiment of the present invention is now disclosed. In step 800 a requirement for a resource-intensive task is recognized in an apparatus. This requirement may originate from, for example, an application executing on the apparatus, and may utilize an existing wireless link, or may require establishment of a new connection utilizing a wireless transport. A determination may then be made in step 802 as to whether any other wireless links exist. If no other wireless links exist (step 804), then the resource-intensive task may be executed since all resources may be available for the required task. The process may the return to step 800 to await the next task.

If in step 802 it is determined that one or more wireless links do exist, then another determination may be made in step 806 as to whether any of existing link will possibly conflict with, or share resources with, the wireless transport that will be used to execute the resource-intensive task. If no conflicts or resource-sharing situations exist, then the process may proceed to step 804 where the resource-intensive task is executed. If either or both of these two conditions do exist, then in step 808 a relative priority may be determined between other existing wireless links and the wireless link (or a wireless transport to be utilized to create a new link) that will be utilized by the resource intensive process. For example, a rule or assumption may dictate that any existing link established using a low-power or low-capacity wireless transport has low priority. If any of the existing wireless links are determined to be of lower priority, then at least one operational or link parameter in one or more of the existing wireless links may be adjusted in order to free up resources for the resource-intensive task. Alternatively, if in step 808 all of the existing wireless links are determined to be of higher priority, then in step 812 the resource-intensive task may be executed using the resources that are available, or possibly an alternative action may occur such as notifying the user that the resource-intensive task cannot be executed at this time. The process may then return to step 800 in preparation for the next task that may require more wireless resources than can be allocated.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
   identifying a resource-intensive task to be executed using a wireless transport;
   determining whether one or more existing wireless links operating within the same channel bandwidth as the wireless transport will interfere with, or share resources with, the wireless transport;
   determining a priority level for the resource-intensive task and priority levels for the one or more existing wireless links; and
   if the priority level of any of the one or more existing wireless links is lower than the priority level of the resource intensive task, adjusting at least one link parameter of the one or more existing wireless links with a lower priority level to reconfigure the one or more existing wireless links to free up resources to the wireless transport for conducting the resource intensive task, wherein the adjusting of at least one link parameter includes increasing an associated link timeout period to avoid disconnection while the link remains idle for a longer period than in normal operation.

2. The method of claim 1, wherein the resource-intensive task to be completed using a wireless transport originates from an application executing on an apparatus.

3. The method of claim 1, wherein determining if any existing wireless link shares resources with the wireless transport comprises determining if any existing wireless link and the wireless transport will require access to the same physical resources in the apparatus.

4. The method of claim 1, wherein determining a priority level between the resource-intensive task and the existing wireless links comprises determining if the wireless transport is, or any existing wireless link uses, a low power or low data capacity wireless transport.

5. The method of claim 1, wherein adjusting link parameters includes modifying at least one connection set-up parameter for one or more of the existing wireless links.

6. The method of claim 1, wherein adjusting link parameters includes at least one of reducing a data rate parameter, reducing a required quality of service parameter or suspending operation for one or more existing wireless links.

7. A computer program product comprising computer executable code recorded on a computer readable storage medium, the computer executable program code comprising:
   code configured to cause an apparatus to identify a resource-intensive task to be executed using a wireless transport;
   code configured to cause an apparatus to determine whether one or more existing wireless links operating within the same channel bandwidth as the wireless transport will interfere with, or share resources with, the wireless transport;
   code configured to cause an apparatus to determine a priority level for the resource-intensive task and priority levels for the one or more existing wireless links; and
   code configured to cause an apparatus to, if the priority level of any of the one or more existing wireless links is lower than the priority level of the resource intensive task, adjust at least one link parameter of the one or more existing wireless links with a lower priority level to reconfigure the one or more existing wireless links to free up resources to the wireless transport for conducting the resource intensive task, wherein the adjusting of at least one link parameter includes increasing an associated link timeout period to avoid disconnection while the link remains idle for a longer period than in normal operation.

8. The computer program product of claim 7, wherein the resource-intensive task to be completed using a wireless transport originates from an application executing on an apparatus.

9. The computer program product of claim 7, wherein determining if any existing wireless link shares resources with the wireless transport comprises determining if any existing wireless link and the wireless transport will require access to the same physical resources in the apparatus.

10. The computer program product of claim 7, wherein determining a priority level between the resource-intensive task and the existing wireless links comprises determining if the wireless transport is, or any existing wireless link uses, a low power or low data capacity wireless transport.

11. The computer program product of claim 7, wherein adjusting link parameters includes modifying at least one connection set-up parameter for one or more of the existing wireless links.

12. The computer program product of claim 7, wherein adjusting link parameters includes at least one of reducing a data rate parameter, reducing a required quality of service parameter or suspending operation for one or more existing wireless links.

13. An apparatus, comprising:
at least one processor; and
at least one memory including computer program code, the at least one memory and the computer program code configured to, with the at least one processor, cause the apparatus at least to:
identify a resource-intensive task to be executed using a wireless transport;
determine whether one or more existing wireless links operating within the same channel bandwidth as the wireless transport will interfere with, or share resources with, the wireless transport;
determine a priority level for the resource-intensive task and priority levels for the one or more existing wireless links; and
if the priority level of any of the one or more existing wireless links is lower than the priority level of the resource intensive task, adjust at least one link parameter of the one or more existing wireless links with a lower priority level to reconfigure the one or more existing wireless links to free up resources to the wireless transport for conducting the resource intensive task, wherein the adjusting of at least one link parameter includes increasing an associated link timeout period to avoid disconnection while the link remains idle for a longer period than in normal operation.

14. The apparatus of claim 13, wherein the resource-intensive task to be completed using a wireless transport originates from an application executing on an apparatus.

15. The apparatus of claim 13, wherein determining if any existing wireless link shares resources with the wireless transport comprises determining if any existing wireless link and the wireless transport will require access to the same physical resources in the apparatus.

16. The apparatus of claim 13, wherein determining a priority level between the resource-intensive task and the existing wireless links comprises determining if the wireless transport is, or any existing wireless link uses, a low power or low data capacity wireless transport.

17. The apparatus of claim 13, wherein adjusting link parameters includes modifying at least one connection set-up parameter for one or more of the existing wireless links.

18. The apparatus of claim 13, wherein adjusting link parameters includes at least one of reducing a data rate parameter, reducing a required quality of service parameter or suspending operation for one or more existing wireless links.

19. An apparatus, comprising:
means for identifying a resource-intensive task to be executed using a wireless transport;
means for determining whether one or more existing wireless links operating within the same channel bandwidth as the wireless transport will interfere with, or share resources with, the wireless transport;
means for determining a priority level for the resource-intensive task and priority levels for the one or more existing wireless links; and
means for, if the priority level of any of the one or more existing wireless links is lower than the priority level of the resource intensive task, adjusting at least one link parameter of the one or more existing wireless links with a lower priority level to reconfigure the one or more existing wireless links to free up resources to the wireless transport for conducting the resource intensive task, wherein the adjusting of at least one link parameter includes increasing an associated link timeout period to avoid disconnection while the link remains idle for a longer period than in normal operation.

20. The apparatus of claim 19, wherein adjusting link parameters includes modifying at least one connection set-up parameter for one or more of the existing wireless links.

21. A system, comprising:
a first apparatus; and
at least one other apparatus;
the first apparatus identifying a resource-intensive task for execution and one or more existing wireless link to the at least one other apparatus that will interfere with, or share resources with, the execution of the resource-intensive task;
the first device determining a priority level for the resource-intensive task and priority levels for the existing wireless links and adjusting at least one link parameter of the one or more existing wireless links with a lower priority level to reconfigure the one or more existing wireless links to free up resources to the wireless transport for conducting the resource intensive task, wherein the adjusting of at least one link parameter includes increasing an associated link timeout period to avoid disconnection while the link remains idle for a longer period than in normal operation.

* * * * *